Jan. 2, 1962        E. D. NUNN        3,015,804
COMBINED BARRICADE AND FLASHING SIGNAL LIGHT
Filed May 17, 1961        3 Sheets-Sheet 1
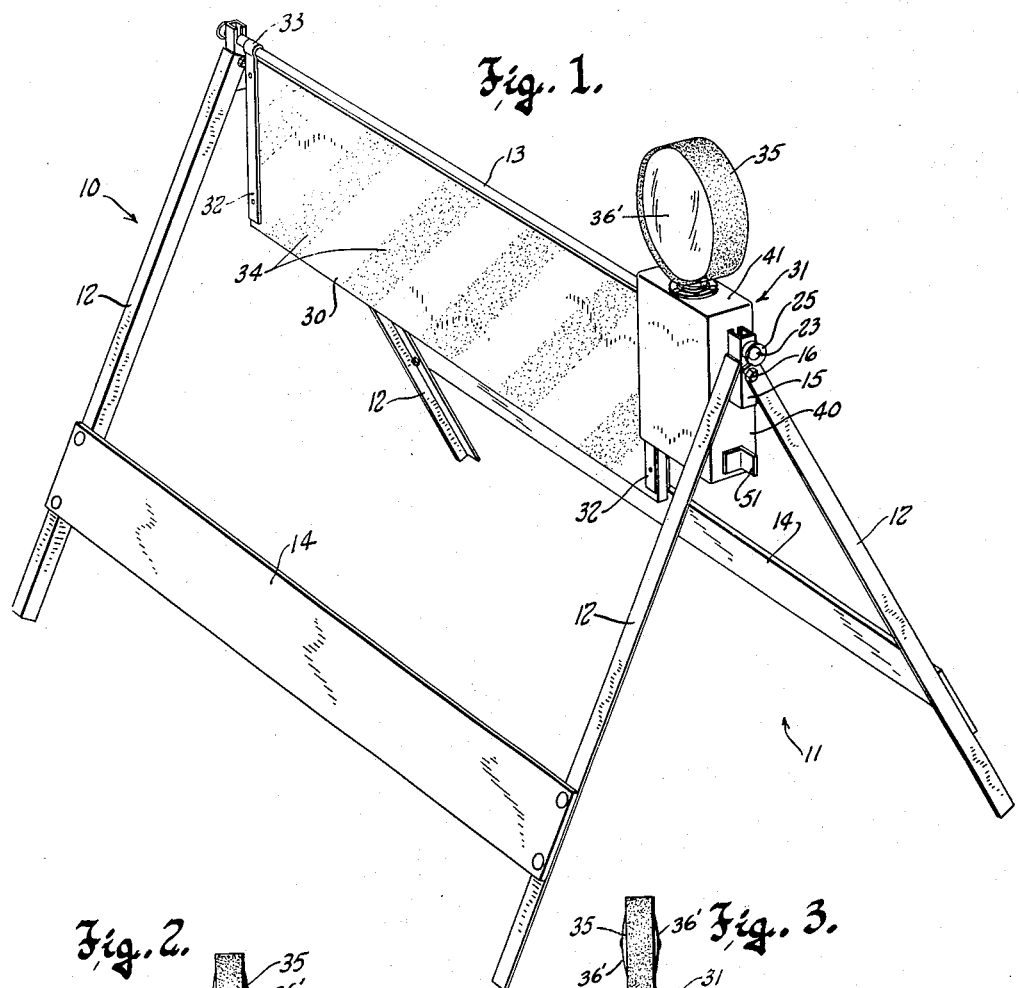
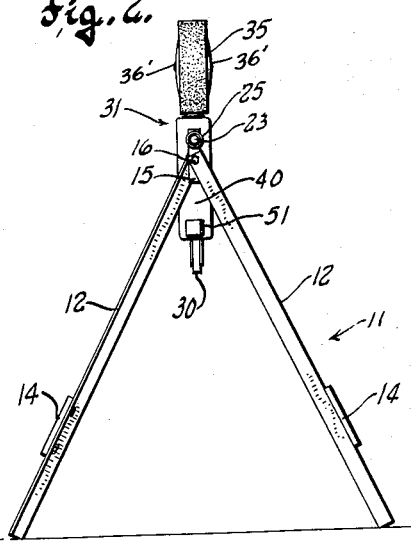
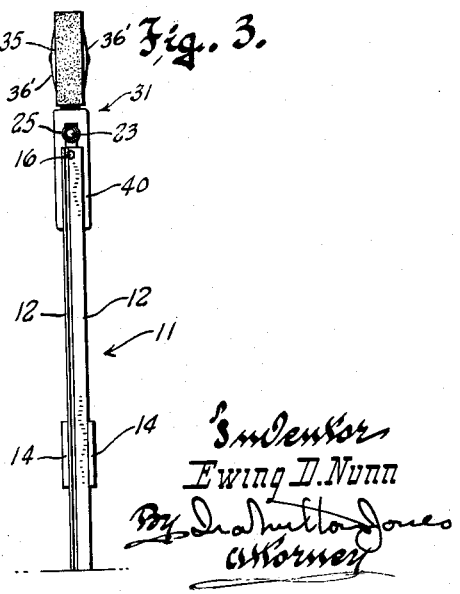
Inventor
Ewing D. Nunn Jan. 2, 1962 — E. D. NUNN — 3,015,804
COMBINED BARRICADE AND FLASHING SIGNAL LIGHT
Filed May 17, 1961 — 3 Sheets-Sheet 2
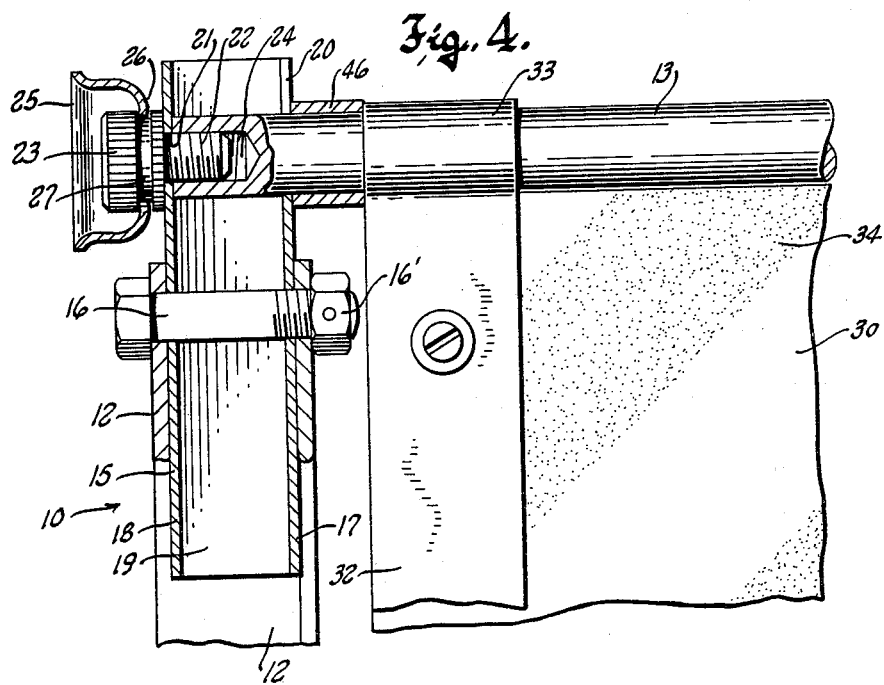
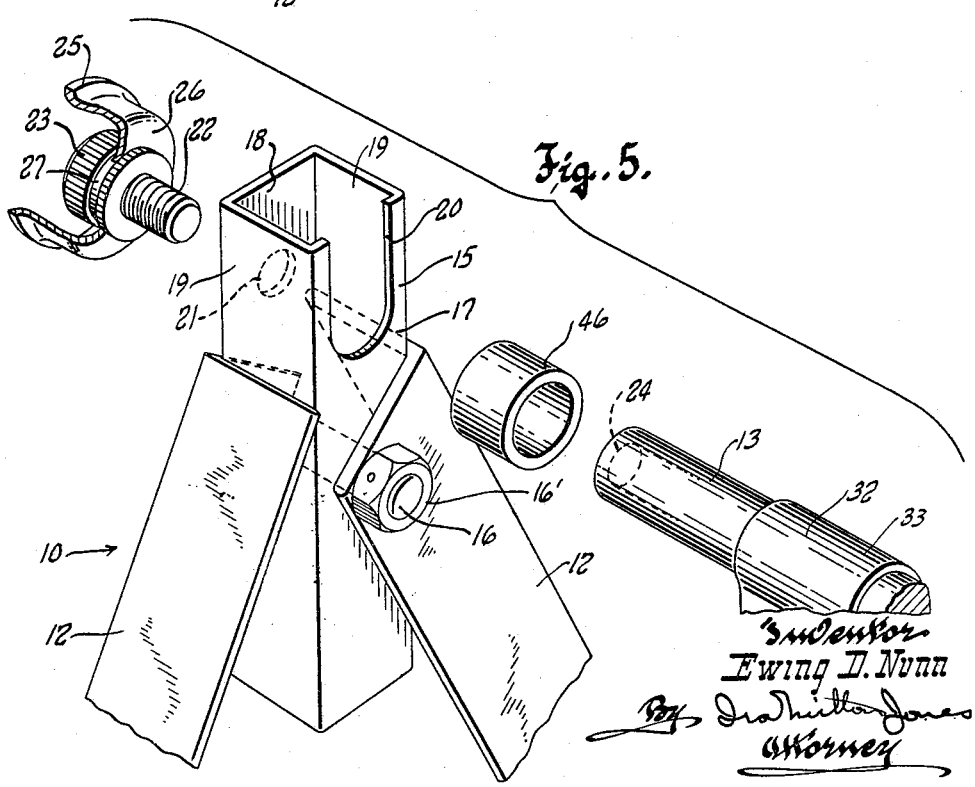
Inventor
Ewing D. Nunn Jan. 2, 1962     E. D. NUNN     3,015,804
COMBINED BARRICADE AND FLASHING SIGNAL LIGHT
Filed May 17, 1961     3 Sheets-Sheet 3
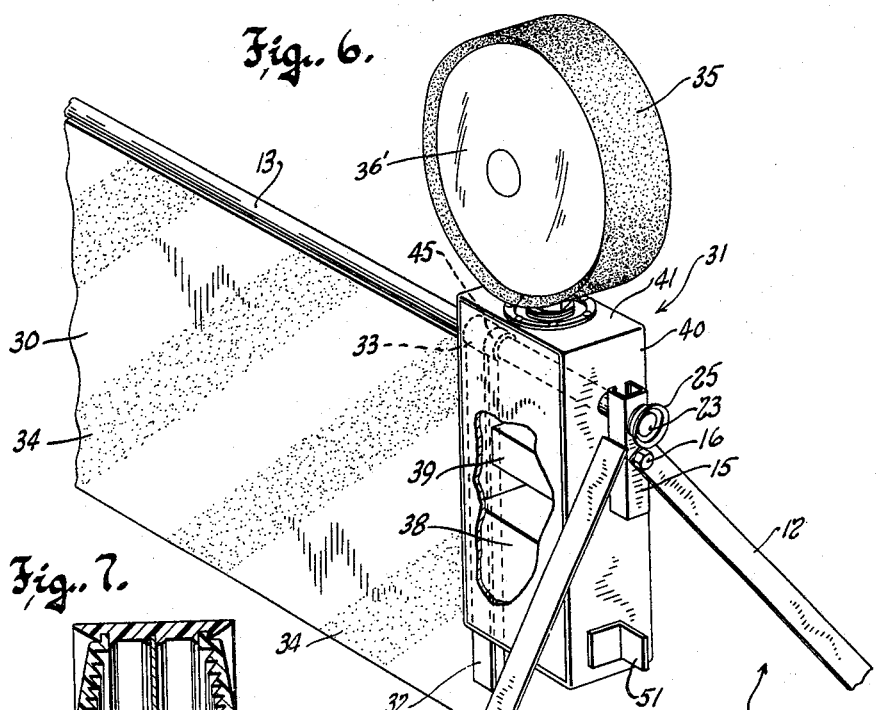
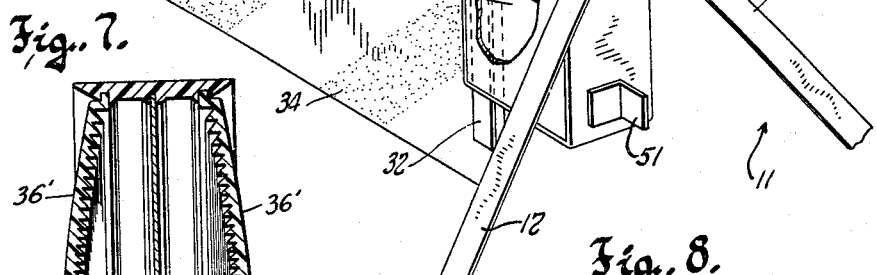
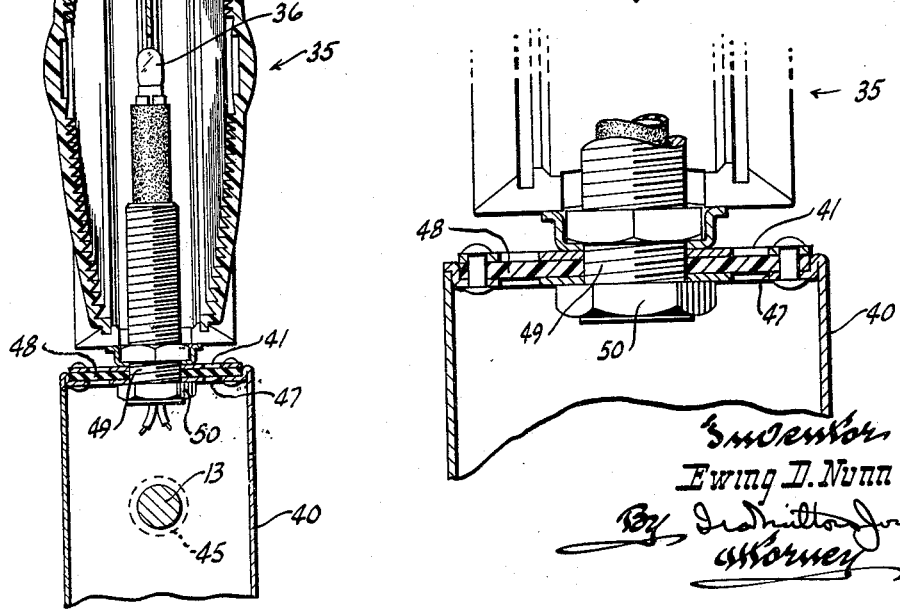
Inventor
Ewing D. Nunn

United States Patent Office 3,015,804
Patented Jan. 2, 1962

3,015,804
COMBINED BARRICADE AND FLASHING SIGNAL LIGHT
Ewing D. Nunn, Mequon, Wis., assignor to Northern Signal Company, Inc., Saukville, Wis., a corporation of Wisconsin
Filed May 17, 1961, Ser. No. 110,745
5 Claims. (Cl. 340—81)

This invention relates to barricades and flashing signal lights used on highway, street, and other construction projects, and has as its purpose to combine a folding barricade and a flashing signal light into one practical highly useful and reliably effective warning device.

More specifically, it is an object of this invention to provide a combined barricade and signal light wherein a panel having an attention attracting appearance and a flasher unit are both suspended from a common leg-supported cross bar for free swinging motion so as to yield to wind pressure thereon and thus reduce the likelihood of tipping, while at the same time enabling the panel and flasher to maintain an upright position despite unevenness of the ground upon which the device stands.

One of the most aggravating and troublesome problems heretofore encountered by contractors and other users of flashing signal lights has been caused by the seemingly irresistable attraction which these blinking lights have to many people not too mindful of the commandment against stealing. The resulting unlawful appropriation of flasher units, especially when they have been placed to serve as warnings of dangerous road or highway conditions, can and in many instances has been the cause of very serious accidents.

With a view toward minimizing the theft of flashing signal lamps, and thereby reducing the likelihood of accidents caused by lack of appropriate warning of a dangerous condition, the flasher unit of this invention is for all intents and purposes permanently attached to the barricade on which it is mounted, so that the only way in which it can be stolen is for the culprit to pick up and carry away the entire structure, and ordinarily this is sufficient dissuasion.

Another object of this invention is to provide a combined barricade and flasher type signal, which folds into a compact relatively flat unit for more convenient storage.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention, constructed according to the best mode so far devised for the practical application of the principles thereof, and in which:

FIGURE 1 is a perspective view of the combined barricade and flashing signal of this invention, illustrating the same in its operative position of use;

FIGURE 2 is an end view of the unit in its operative position of use;

FIGURE 3 is an end view of the unit shown folded for storage and transportation;

FIGURE 4 is an enlarged fragmentary detail view illustrating the manner in which the leg units of the device are connected to and support the panel of the barricade;

FIGURE 5 is an exploded perspective view of the structure shown in FIGURE 4;

FIGURE 6 is an enlarged perspective view of a portion of the unit, to illustrate particularly the manner in which the flasher is mounted;

FIGURE 7 is a longitudinal sectional view through the flasher; and

FIGURE 8 is an enlarged fragmentary detail sectional view of a portion of the flasher.

Referring now particularly to the accompanying drawings, the numerals 10 and 11 designate spaced apart leg units, each of which consists of a pair of hingedly connected legs 12, preferably made of angle iron. These leg units are connected at their upper ends by a round rod 13 and near their lower ends by cross pieces 14.

The hinged connection between the legs 12 of each leg unit comprises a connecting member 15 and a bolt 16 which passes through one of the flanges of each angle iron leg and through the connecting member. Preferably the connecting member 15 is a square tube having flat inner and outer walls 17 and 18, respectively, connected by side walls 19. The width of these walls is slightly less than that of the flanges of the angle iron legs, and the holes in the flanges of the legs through which the bolt 16 passes are nearer the edges of the flanges than the bases thereof, so that the legs may be folded upon one another. To guard against disassembly of the leg units, the nuts 16' of the hinge bolts are pinned to the bolts.

The rod 13 is connected to the leg units, and more specifically to the connecting members 15 of the leg units in a way which affords maximum assurance against disassembly of the structure. Thus, as best seen in FIGURES 4 and 5, the end portions of the rod 13 are seated in upwardly opening notches 20 in the inner walls 17 of the connecting members, in coaxial alignment with holes 21 in the outer walls 18 of the connecting members. Screws 22 with round heads 23 having serrated edges are passed through the holes 21 and threaded into sockets 24 in the ends of the rod 13.

To guard against unauthorized removal of the screws 22, torque applying engagement with the heads of the screws is restricted by cup-shaped guards 25. These guards are freely rotatably mounted upon the heads of the screws so that torque cannot be transmitted to the screws through the guards, and to afford maximum protection the side walls of the guards are relatively close to the edges of the screw heads and project well beyond the heads. To mount the guards their bottom walls 26 have holes which initially are large enough to receive the screw heads, and which are then constricted to force the edges thereof into grooves 27 in the screw heads. This assembly of the guards with the screws presents no problem to manufacturers of special screws and fastening devices; and as will be obvious, because of the guards and the substantially round shape of the screw heads, a special socket wrench is required to tighten or loosen the screws.

The rod 13 has a panel 30 and a flasher unit, indicated generally by the numeral 31 mounted thereon in a manner allowing both to swing freely about the rod 13 independently of one another, and to normally hang in a vertical or upright position.

The panel 30 preferably consists of a wooden board or metal plate, with mounting straps 32 on its ends. The straps 32 have loop portions 33 which freely rotatably engage over the rod 13. Hence the panel 30 hangs from the rod and normally maintains an upright or vertical position, despite the fact that the legs may stand on uneven ground. Being freely suspended in this manner, the panel 30 also is free to yield to wind pressure thereon, which reduces the likelihood of the entire barricade being tipped over by the wind.

Any suitable warning indicia may be painted or otherwise delineated on the panel, as for instance diagonal stripes 34 applied with luminous paint or the like. In any event, the panel should have an attention attracting appearance, and while it is preferably in the form of a stiff board or plate, it could be made of heavy fabric.

The flasher 31 consists of a lamp unit 35 having a light bulb 36 mounted between oppositely facing coaxial colored lenses 36', a battery 38, and flasher mechanism 39 which periodically effects energization of the light bulb from the current delivered by the battery. Since this invention is not concerned with the circuitry or structure of the flasher mechanism, it has not been illustrated. The important consideration, from the standpoint of this invention, is that the battery and the flasher mechanism are housed within a relatively strong metal container or box 40, and that the lamp unit is permanently mounted on the top wall 41 of this box or container.

The rod 13 passes through the upper portion of the box or container, and since the battery, which is quite heavy, is in the bottom of the box, the point at which the rod 13 passes through the box is above the center of gravity of the entire unit. Hence the flasher unit, like the panel 30, is free to swing about the rod 13 and to hang in an upright position with the axis of the lenses 36' normal to the vertical axis of the box 40 assuring that the flashing signal will be effective as a warning despite the fact that the ground upon which the barricade stands may not be level.

To assure that the panel and the flasher unit may swing independently of one another, a short spacing collar 45 is placed on the rod 13 between the box of the flasher unit and the adjacent mounting strap of the panel, and so that the leg units will not interfere with free swinging of the flasher unit and the panel, similar spacing collars 46 are mounted on the end portions of the rod 13.

The specific construction of the lamp unit forms per se no part of this invention, and hence need not be defined here. The manner in which the lamp unit is mounted on the top wall 41 of the box or container, however, is significant to this invention because it helps make the device as indestructible and reliable as possible.

As best seen in FIGURE 8, the top wall 41 of the box or container has a relatively large diameter round hole 47, and secured to the marginal edge of this hole is a disc 48 of flexible weather-proof material, such as polyvinyl chloride. At its center, the disc 48 has a hole through which a nipple 49 projecting downwardly from the lamp, passes to have a clamping nut 50 threaded thereon and clamped against the underside of the resilient disc 48. The disc thus provides a shock resistant mounting for the lamp unit.

As indicated hereinbefore, the lamp unit, like the panel, is free to swing about the rod 13 in response to wind pressure thereon, but preferably the extent the flasher unit may swing is limited by a stop 51 projecting from the lower part of its housing to collide with one or the other of the adjacent legs if the flasher unit is swung too far.

From the foregoing description taken in connection with the accompanying drawings, it will be readily apparent to those skilled in this art, that this invention provides a greatly improved barricade and flashing signal, which in addition to possessing an exceptionally pleasing appearance has the significant advantage of being stable even in a high wind, and of normally maintaining its warning panel and flasher unit in an upright clearly visible position despite unevenness of the ground upon which the device may stand.

What is claimed as my invention is:

1. A warning barricade comprising the combination of: spaced apart leg units; a panel having an attention-attracting appearance; a flasher unit including a lamp, a battery lens means through which the light of the lamp shines, mechanism to periodically energize the lamp with current from the battery, and a closed metal container housing the battery and said mechanism and having the lamp and the lens means mounted thereon with the axis of the lens means transverse to the vertical axis of the metal container so that the container must be in an upright position for the lamp to provide an effective warning, said closed metal container having opposite upright side walls with aligned holes therein above the center of gravity of the flasher unit; a rod supported at its ends upon said leg units, the rod passing through said aligned holes in the side walls of the metal container to hingedly support the flasher unit in an upright position despite unevenness of the ground upon which the leg units stand; and means hingedly connecting the panel above its center of gravity with said rod so that the panel normally hangs in a vertical position but is free to swing in response to wind pressure thereon.

2. The barricade of claim 1, wherein each leg unit comprises a pair of legs hingedly connected at their upper end portions, the means for hingedly connecting each pair of legs comprising a connecting member to which both legs of the pair are hingedly attached, said connecting member having a portion thereof projecting above the legs and having a hole therethrough; internally threaded sockets in the ends of the rod; and a screw passing through said hole in each of the connecting members and threaded into the socket in the adjacent end of the rod, each screw having a head bearing against the adjacent connecting member, whereby the connecting members are secured to the rod and detachment of the flasher unit from the rod is prevented except upon removal of one of the screws.

3. The barricade of claim 2, wherein the upwardly projecting end portion of each of said connecting members is tubular and has inner and outer walls spaced apart along the axis of the rod, the outer walls having the screw receiving holes therethrough and the inner walls having upwardly opening notches therein, the end portions of the rod being received in said notches and supported by the bottoms thereof coaxially of the holes, and the outer walls being confined between the heads of the screws and the ends of the rod.

4. The barricade of claim 3, wherein the legs are angle irons and the connecting member for each pair of legs is a four-sided tube, and wherein the hinged connection between the legs and the connecting member is a single bolt passing through two opposite walls of the tube and through one of the flanges of each angle iron leg, the legs being so disposed with respect to each other that the inside faces of their flanges face each other and thus embrace the tube.

5. A portable warning device comprising the combination of: an electric lamp; lens means through which the light of the lamp shines when the lamp is energized; a battery; mechanism to periodically energize the lamp with current from the battery; a closed metal box containing the battery and said mechanism and having said lens means and the lamp mounted on and projecting from the top of the closed metal box with the axis of the lens means transverse to the vertical axis of the box; the box with the battery, said mechanism, the lamp and the lens means constituting a flasher unit; the metal box having upright side walls with aligned holes therein above the center of gravity of the flasher unit; a pair of leg units one at each side of the flasher unit; a rod joining the leg units near the top thereof and passing through the aligned holes in the side walls of the metal box of the flasher unit to swingingly mount the flasher unit between the leg units, so that the flasher unit is free to swing about the rod and to hang in an upright position at which its lens means is in proper position for the lamp to provide an effective warning despite unevenness of the ground upon which the leg units stand; and means protecting the connections of the rod with the leg units against unauthorized disassembly.

References Cited in the file of this patent
UNITED STATES PATENTS

| | | |
|---|---|---|
| 1,863,756 | Lufkin | June 21, 1932 |
| 1,983,174 | Joerger et al. | Dec. 4, 1934 |
| 2,507,880 | Bell | May 16, 1950 |
| 2,648,761 | Schamel | Aug. 11, 1953 |
| 2,777,415 | Martin et al. | Jan. 15, 1957 |